(12) United States Patent
Lim

(10) Patent No.: US 7,764,336 B2
(45) Date of Patent: Jul. 27, 2010

(54) LIQUID CRYSTAL DISPLAY MODULE WITH SCATTERING MATERIAL COATING ON UPPER SURFACE PORTION OF LAMP

(75) Inventor: Moo-Jong Lim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 42 days.

(21) Appl. No.: 10/747,069

(22) Filed: Dec. 30, 2003

(65) Prior Publication Data

US 2004/0257493 A1    Dec. 23, 2004

(30) Foreign Application Priority Data

Jun. 18, 2003   (KR) ...................... 10-2003-0039369

(51) Int. Cl.
*G02F 1/1335* (2006.01)
(52) U.S. Cl. .............. 349/70; 349/61; 349/68; 349/69; 349/112
(58) Field of Classification Search ........... 349/61, 349/68, 69–71, 112; 345/87; 362/255, 256, 362/33, 97, 257, 611, 614; 355/70, 67; 313/110–111
See application file for complete search history.

(56) References Cited

U.S. PATENT DOCUMENTS

| | | | | |
|---|---|---|---|---|
| 4,869,927 A | * | 9/1989 | Kawakatsu et al. ......... 427/106 |
| 5,143,433 A | * | 9/1992 | Farrell ........................ 362/29 |
| 5,723,937 A | * | 3/1998 | Whitman et al. ........... 313/116 |
| 5,982,090 A | * | 11/1999 | Kalmanash .................. 313/493 |
| 6,234,656 B1 | * | 5/2001 | Hosseini et al. ............. 362/556 |
| 6,282,029 B1 | * | 8/2001 | Ma et al. ..................... 359/629 |
| 6,327,091 B1 | * | 12/2001 | Agano ........................ 359/619 |
| 6,402,343 B1 | * | 6/2002 | Vollkommer et al. ....... 362/256 |
| 6,536,933 B1 | * | 3/2003 | Gettemy et al. ............. 362/561 |
| 6,908,202 B2 | * | 6/2005 | Graf et al. ..................... 362/26 |
| 2001/0017674 A1 | * | 8/2001 | Yamaguchi .................. 349/61 |
| 2004/0008524 A1 | * | 1/2004 | Lee et al. ..................... 362/561 |
| 2004/0179777 A1 | * | 9/2004 | Buelow et al. ................. 385/31 |

FOREIGN PATENT DOCUMENTS

| | | | |
|---|---|---|---|
| JP | 01-167883 | * | 3/1989 |
| JP | 08-298100 | | 11/1996 |
| JP | 20011243922 | * | 9/2001 |
| JP | 022211243922 | * | 9/2001 |
| JP | 2002-277864 | | 9/2002 |
| JP | 2002-372918 | | 12/2002 |

* cited by examiner

*Primary Examiner*—Hoan C Nguyen
(74) *Attorney, Agent, or Firm*—McKenna Long & Aldridge LLP

(57) ABSTRACT

A liquid crystal display module device includes a lamp housing, a plurality of lamps in the lamp housing, and a scattering material formed on a surface portion of the lamps.

6 Claims, 9 Drawing Sheets

US 7,764,336 B2

LIQUID CRYSTAL DISPLAY MODULE WITH SCATTERING MATERIAL COATING ON UPPER SURFACE PORTION OF LAMP

The present invention claims the benefit of Korean Patent Application No. P2003-39369 filed in Korea on Jun. 18, 2003, which is hereby incorporated by reference.

BACKGROUND OF THE INVENTION

1. Field of the Invention

The present invention relates to a display module, and more particularly, to a liquid crystal display module.

2. Description of the Related Art

In general, liquid crystal display module (LCM) devices have been incorporated into various display devices because of their light weight, thin profile, and low power consumption. For example, the LCM devices are commonly used in office automation devices and audio/video devices. The LCM devices adjust light transmission in accordance with images signal supplied to a matrix array of control switches to display desired images into a display screen. However, since the LCM devices are not spontaneous light-emitting devices, the LCM devices require a back light unit to function as a light source.

Two types of the backlight units used for the LCM devices include direct-below-type and edge-type backlight units. The direct-below-type LCM device includes a plurality of lamps arranged below a liquid crystal panel, wherein a diffusion plate is provided between the lamps and the liquid crystal panel to diffuse the light produced by the lamps and to maintain a uniform gap between the lamps and the liquid crystal panel. The edge-type LCM device includes a lamp installed along an edge of a light-guide plate to irradiate light to the liquid crystal panel via the light-guide-plate.

FIG. 1 is a cross sectional view of direct-below-type back light unit according to the related art. In FIG. 1, a direct-below-type back light unit includes a plurality of lamps 12 placed parallel with each other for generating light, a lamp housing 10 for accommodating the lamps 12, a diffusion plate 14 covering an open portion of the lamp housing 10, and a diffusion film 16 and a dual brightness enhancement film (DBEF) 18 stacked sequentially on the diffusion plate 14. Each of the lamps 12 comprises a glass tube filled with inert gases, and a cathode and an anode installed at opposite ends of the glass tube. In addition, inner walls of the glass tube are coated with phosphor material.

FIG. 2 is a schematic perspective view of a lamp of FIG. 1 according to the related art. In FIG. 2, when alternating current from an inverter (not shown) is supplied to a high voltage electrode H (i.e., first envelope) and a low voltage electrode L (i.e., a second envelope) of each lamp 12, electrons are emitted from the low voltage electrode L. Accordingly, the emitted electrons collide with the inert gases contained within the glass tube, wherein a number of the electrons exponentially increases. Next, the increased number of electrons generate electric currents within the glass tube, thereby exciting the inert gases to emit ultraviolet light. Then, the ultraviolet light collides with the phosphor material coated on the inner walls of the glass tube, thereby generating visible light.

In FIG. 1, the lamp housing 10 prevents leakage of the visible light radiated from each of the lamps 12, and reflects the light incident to sides and rear surfaces of the lamp housing 10 toward the diffusion plate 14 positioned at a front of the lamp housing 10, thereby increasing light radiation efficiency of the lamps 12. In addition, reflection plates (not shown) are formed on a bottom surface and the sides of the lamp housing 10. The diffusion plate 14 diffuses the light radiated from the lamps 12 toward the liquid crystal panel over a wide range of incident angles. The diffusion plate 14 includes a transparent resin film having opposing surfaces coated with light-diffusion material. Accordingly, the diffusion film 16 and the DBEF 18 increase a diffusion efficiency of the light transmitted through the diffusion plate 14. An LCM device employing the direct-below-type back light unit is commonly used for large-screen televisions. However, as shown in FIG. 1, lamp housing 10 has a relatively large depth L1.

FIG. 3 is a cross sectional view of another direct-below-type back light unit according to the related art. In FIG. 3, a direct-below-type back light unit has a plurality of scattering printed patterns 20 on the rear surface of the diffusion plate 14. Accordingly, the scattering printed patterns 20 are formed at designated intervals to scatter the light generated from each of the lamps 12. Due to the scattering effect by the scattering printed patterns 20, it is possible to decrease a depth L2 of the lamp housing 10 be less than the depth L1 of the lamp housing 10 of FIG. 1.

The scattering printed patterns 20 decreases the gap between the diffusion plate 14 and the lamps 12 to create a uniform brightness. In addition, the depth L2 of the lamp housing 10 decreases an overall thickness of the direct-be-low-type back light unit. However, the light radiated from adjacent lamps 12 and scattered by the scattering printed patterns 20 is partially overlapped, thereby increasing the brightness at the overlapped portion. Thus, the brightness is not uniform.

FIG. 4 is a cross sectional view of another direct-below-type back light unit according to the related art. In FIG. 4, a direct-below-type back light unit includes a plurality of protrusions 24 that project from the bottom surface of the reflection plate 22 toward the lamps 12 inside the lamp housing 10. The protrusions 24 of the reflection plate 22 are formed having a triangular form and are disposed within every gap between the adjacent lamps 12. The protrusions 24 prevent interference of light between the adjacent lamps 12 and increase brightness uniformity.

In addition, the protrusions 24 reduce the gap between the diffusion plate 14 and the lamps 12 to create a uniform brightness. Accordingly, a depth L3 of the lamp housing 10 reduces a thickness of the direct-below-type back light unit. However, in order to further reduce the thickness of the direct-below-type back light unit, the geometric shape of the reflection plate 22 must be changed.

SUMMARY OF THE INVENTION

Accordingly, the present invention is directed to a liquid crystal display module that substantially obviates one or more of the problems due to limitations and disadvantages of the related art.

An object of the present invention is to provide a liquid crystal display module having a low profile back light unit.

Another object of the present invention is to provide a liquid crystal display module having a uniform brightness.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display module device includes a lamp housing, a plurality of lamps in the lamp housing, and a scattering material formed on a surface portion of the lamps.

In another aspect, a liquid crystal display module device includes a plurality of lamps, a lamp housing accommodating the lamps, a reflection plate arranged on bottom and side surfaces of the lamp housing, the reflection plate having a plurality of protrusions that project along a direction to the lamps, a diffusion film covering the lamp housing, a dual brightness enhancement film on the diffusion film, and a liquid crystal display panel disposed on the dual brightness enhancement film.

In another aspect, a liquid crystal display module device includes a plurality of lamps, a lamp housing accommodating the plurality of lamps, a reflection plate arranged along an inner surface of the lamp housing, a plurality of films covering an open portion of the lamp housing, and a liquid crystal display panel disposed on the open portion of the lamp housing, wherein the reflection plate includes a plurality of protrusions disposed between each of the plurality of lamps to extend along a direction toward the liquid crystal display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
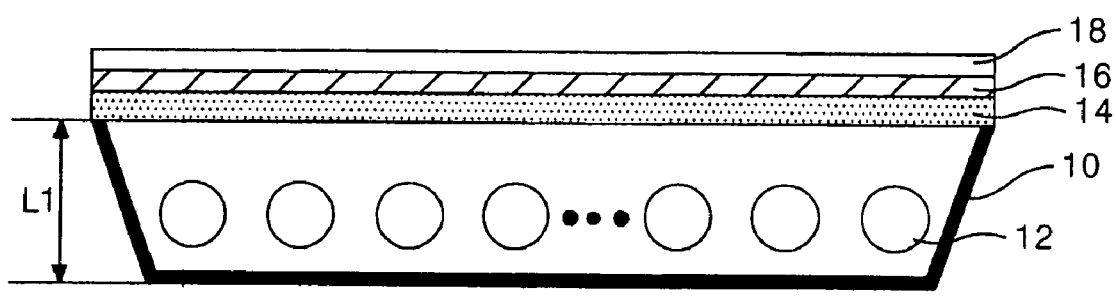
FIG. 1 is a cross sectional view of direct-below-type back light unit according to the related art.
Figure 2:
FIG. 2 is a schematic perspective view of a lamp of FIG. 1 according to the related art.
Figure 3:
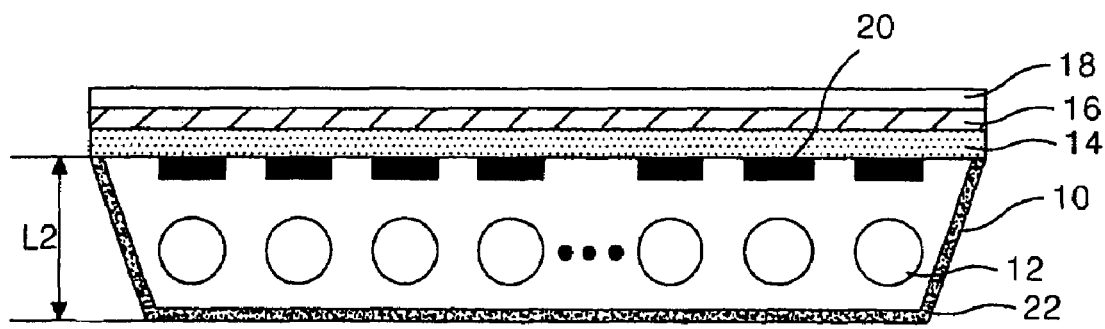
FIG. 3 is a cross sectional view of another direct-below-type back light unit according to the related art.
Figure 4:
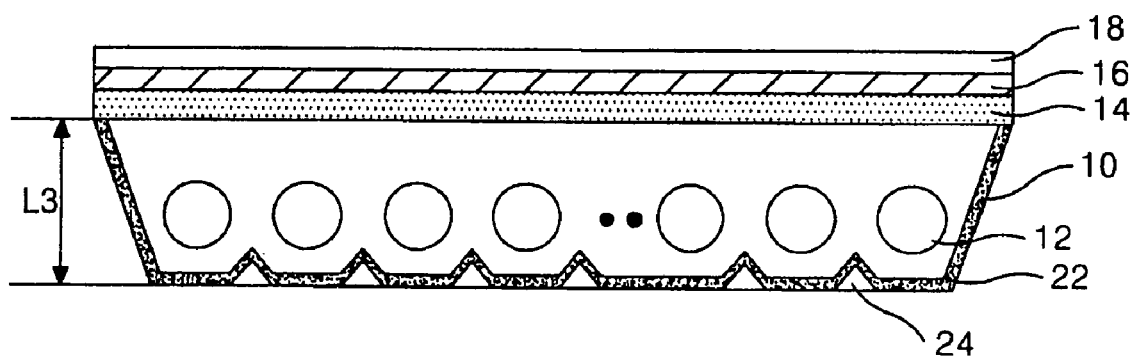
FIG. 4 is a cross sectional view of another direct-below-type back light unit according to the related art.
Figure 5:
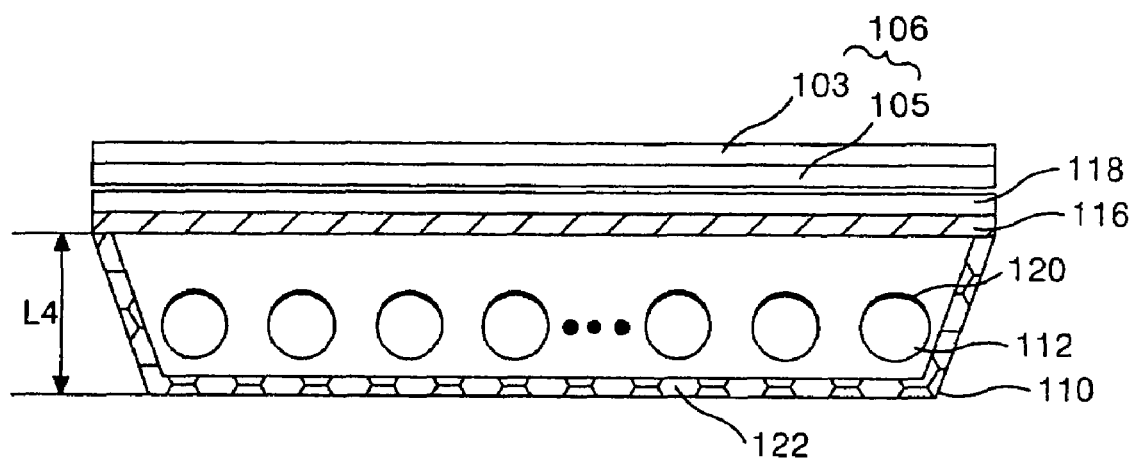
FIG. 5 is a cross sectional view of an exemplary liquid crystal display module according to the present invention.

FIG. 5 is a cross sectional view of an exemplary liquid crystal display module according to the present invention. In FIG. 5, an LCM device may include a plurality of lamps 112 placed parallel with each other for generating light, a scattering material 120 applied to designated portions of the lamps 112, a lamp housing 110 accommodating the lamps 112, a diffusion film 116 and a dual brightness enhancement film (DBEF) 118 stacked sequentially to cover an open portion of the lamp housing 110, and a liquid crystal display panel 106 positioned above the DBEF 118.

The liquid crystal display panel 106 may include an upper substrate 103, a lower substrate 105, liquid crystal material within a space between the upper and lower substrates 103 and 105, and a plurality of spacers (not shown) maintaining a gap between the upper and lower substrates 103 and 105. Although not shown, the upper substrate 103 may include a color filter, a common electrode, and a black matrix, and the lower substrate 105 may include signal lines, such as data and gate lines, and a thin film transistor (TFT) disposed at crossing regions of the data and gate lines. Accordingly, in response to scan signals (gate pulses) transmitted along the gate line, the TFT switches data signals supplied from the data line to a liquid crystal cell. In addition, a pixel electrode may be disposed within a cell area divided by the data and gate lines, and a pad area may be provided along one side of the lower substrate 105 to which the data line and the gate line may be respectively connected. Furthermore, a tape carrier package (not shown) having a driver integrated circuit mounted thereon may be attached to the pad area, wherein the tape carrier package may supply the data signals and scan signals from the driver integrated circuit to the data line and gate line respectively.

An upper polarizing sheet (not shown) may be attached to the upper substrate 103 of the liquid crystal display panel 106, and a lower polarizing sheet (not shown) may be attached to the rear surface of the lower substrate 105. The upper and lower polarizing sheets may widen viewing angles for images displayed by the liquid crystal cells.

In FIG. 5, each of the lamps 112 may include a glass tube filled with inert gases, and a cathode and an anode disposed at opposing ends of the glass tube. In addition, inner walls of the glass tube may be coated with phosphor material.

Figure 6:
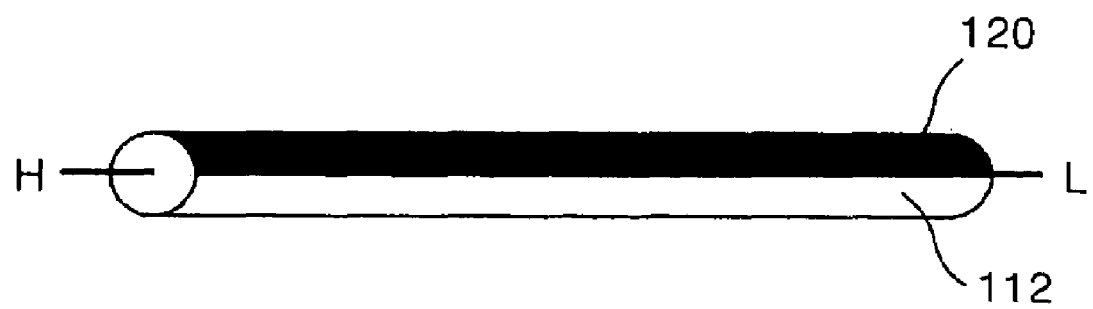
FIG. 6 is a schematic perspective view of an exemplary lamp of FIG. 5 according to the present invention.

FIG. 6 is a schematic perspective view of an exemplary lamp of FIG. 5 according to the present invention. In FIG. 6, when alternating current from an inverter (not shown) is applied to a high voltage electrode H (i.e., first envelope) and a low voltage electrode L (i.e., second envelope) of each lamp 112, electrons are emitted from the low voltage electrode L. Then, the emitted electrons collide with the inert gases within the glass tube, and a number of the electrons exponentially increases. Next, the electrons excite the inert gases to emit ultraviolet light. Then, the ultraviolet light collides with the phosphor material coated on the inner walls of the glass tube, thereby generating visible light.

In FIG. 5, the scattering material 120 may include at least one titanium oxide ($TiO_2$) and silicon dioxide ($SiO_2$) coated on surface portions of the lamps 112 that face the diffusion film 116, i.e., upper surface portions of the lamps 112. Accordingly, the scattering material 120 may scatter the visible light generated within the lamp 112 and direct the visible light toward the diffusion film 116. Thus, the lamp housing 110 may prevent leakage of the visible light radiated from each of a plurality of lamps 112 and may reflect the light incident to the sides and rear surfaces of the lamp housing 110 toward the open portion of the lamp housing 110. In addition, the diffusion film 116 may increase a light efficiency of the light radiated from the lamps 112 and a plurality of reflection plates 122 may be formed on the bottom surface and the sides of the lamp housing 110, thereby providing a lamp housing 110 having a depth L4. Furthermore, the DBEF 118 may select only one of P-polarized and S-polarized constituents from the irradiated light via the diffusion film 116, thereby increasing the light efficiency. According to the present invention, the scattering material 120 applied to each of the lamps 112 contributes to preventing interference of the light between adjacent lamps 112.

Figure 7:
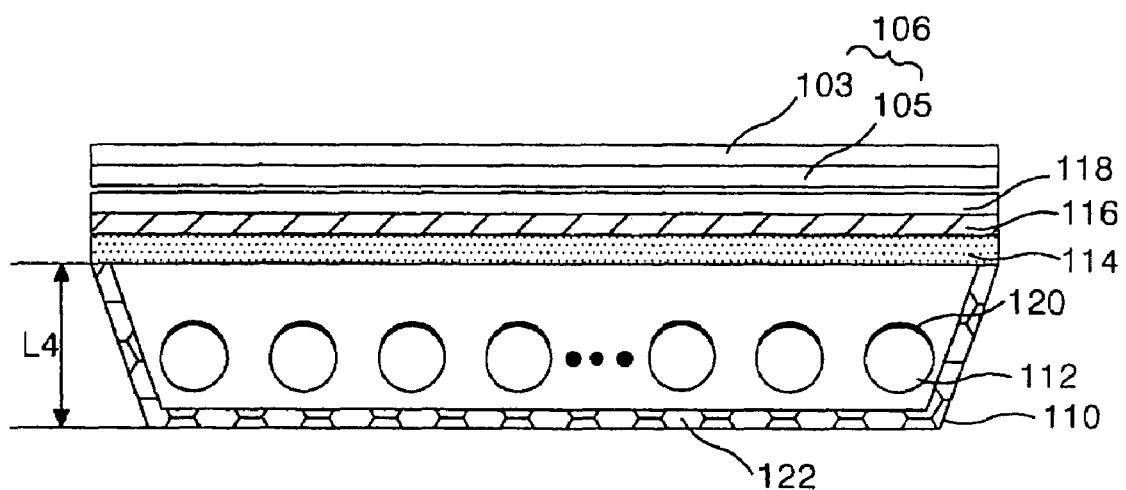
FIG. 7 is a cross sectional view of another exemplary liquid crystal display module according to the present invention.

FIG. 7 is a cross sectional view of another exemplary liquid crystal display module according to the present invention. In FIG. 7, an LCM device may include components similar to the LCM device of FIG. 5 and may further include a diffusion plate 114 disposed between the lamp housing 110 and the diffusion film 116. Accordingly, similar explanations provided from the LCM device of FIG. 5 have been omitted for brevity except for the diffusion plate 114.

In FIG. 7, the diffusion plate 114 may direct the light radiated from the plurality of the lamps 112 toward the liquid crystal panel (not shown) to provide a wide range of incident angles. The diffusion plate 114 may include a transparent resin film having opposing surfaces coated with light-diffusion material. Accordingly, the LCM device having the diffusion plate 114 may provide for increasing uniformity of the irradiated light to the liquid crystal display panel 106.

Figure 8:
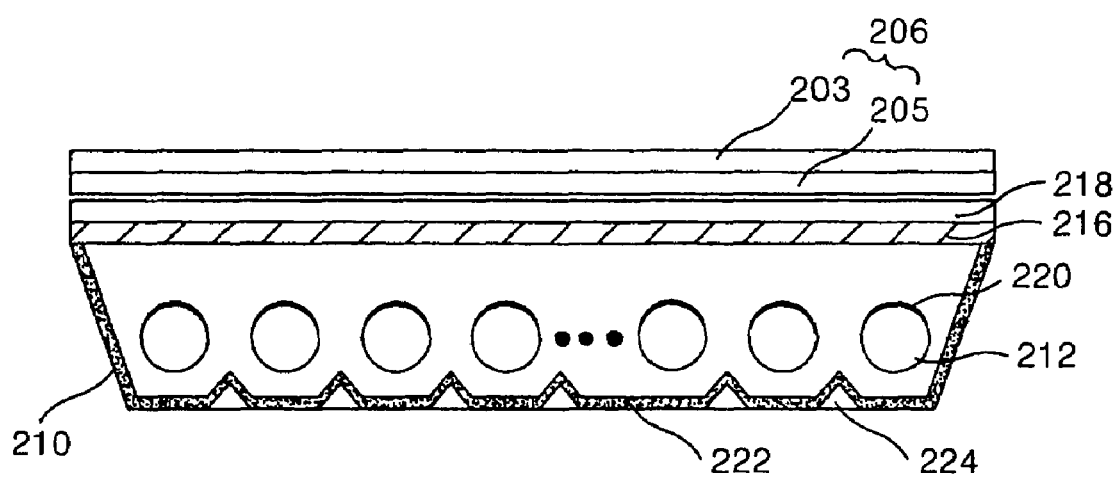
FIG. 8 is a cross sectional view of another liquid crystal display module according to the present invention.

FIG. 8 is a cross sectional view of another liquid crystal display module according to the present invention. In FIG. 8, an LCM device may include a plurality of lamps 212 placed parallel with each other for generating light, scattering material 220 applied to surface portions of the lamps 212, a lamp housing 210 for accommodating the lamps 212, a reflection plate 222 disposed on a bottom surface and inner sides of the lamp housing 210, a plurality of protrusions disposed on the reflection plate 222 to project from each gap between the lamps 212, a diffusion film 216 and a dual brightness enhancement film (DBEF) 218 stacked sequentially covering an open portion of the lamp housing 110, and a liquid crystal display panel 206 positioned above the DBEF 218.

The liquid crystal display panel 206 may include an upper substrate 203, a lower substrate 205, liquid crystal material within a space between the upper and lower substrates 203 and 205, and a plurality of spacers (not shown) for maintaining a gap between the upper and lower substrates 203 and 205. Although not shown, the upper substrate 203 may include a color filter, a common electrode, and a black matrix, and the lower substrate 205 may include signal lines, such as data and gate lines, and a thin film transistor (TFT) disposed at crossing regions of the data and gate lines. In response to scan signals (gate pulses) transmitted along the gate line, the TFT may switch data signals supplied from data line to a liquid crystal cell. In addition, a pixel electrode may be disposed with a cell area divided by the data and gate lines, and a pad area may be provided on one side of the lower substrate 205 where the data line and the gate line are connected. Moreover, a tape carrier package (not shown) having a driver integrated circuit mounted thereon may be attached to the pad area, wherein the tape carrier package may supply the data and scan signals from the driver integrated circuit to the data and gate lines, respectively.

Although not shown in FIG. 8, an upper polarizing sheet may be attached to the upper substrate 203 of the liquid crystal display panel 206, and a lower polarizing sheet may be attached to the rear surface of the lower substrate 205. Accordingly, the upper and lower polarizing sheets may widen viewing angles for images displayed by the liquid crystal cells.

In FIG. 8, each of the lamps 212 may include a glass tube filled with inert gases, and a cathode and an anode positioned at opposing ends of the glass tube. In addition, inner walls of the glass tube may be coated with phosphor material. Accordingly, when alternating current from an inverter (not shown) is applied to a high voltage electrode H (i.e., first envelope) and a low voltage electrode L (i.e., second envelope) of each lamp 212, electrons are emitted from the low voltage electrode L. Next, the emitted electrons collide with the inert gases contained within the glass tube, and a number of electrons exponentially increases. Then, the electrons excite the inert gases to emit ultraviolet light, whereby the ultraviolet light collides with the phosphor material coated on the inner walls of the glass tube to generate visible light.

In FIG. 8, the scattering material 220 may include at least one of titanium oxide ($TiO_2$) and silicon dioxide ($SiO_2$) and may be coated on surface portions of the lamp 212 that face the diffusion film 216, i.e., on upper surface portions of the lamp 212. The scattering material 220 scatters the visible light generated from the lamp 212 and directs them toward the diffusion film 216. Accordingly, a thickness of the lamp housing 210 may be decreased by employing the scattering material.

The reflection plate 222 may be formed on the inner side and bottom surface of the lamp housing 210 to prevent leakage of the visible light radiated from the lamps 212, and may reflect the light incident to the sides and rear of the lamp housing 210 toward the open portion of the lamp housing 210, thereby increasing light efficiency of the lamps 212.

The protrusions 224 of the reflection plate 222 may be formed having triangular shapes, and may be disposed with gaps between adjacent lamps 212. The protrusions 224 may prevent light interference between the adjacent lamps 212, and may increase the brightness uniformity. In addition, the protrusions 224 may project from the bottom surface of the reflection plate 222 having other geometrical shapes, such as polygonal semicircular shapes. Moreover, the DBEF 218 may select one of P-polarized and S-polarized constituents from the irradiated light via the diffusion film 216, thereby increasing light efficiency.

Figure 9:
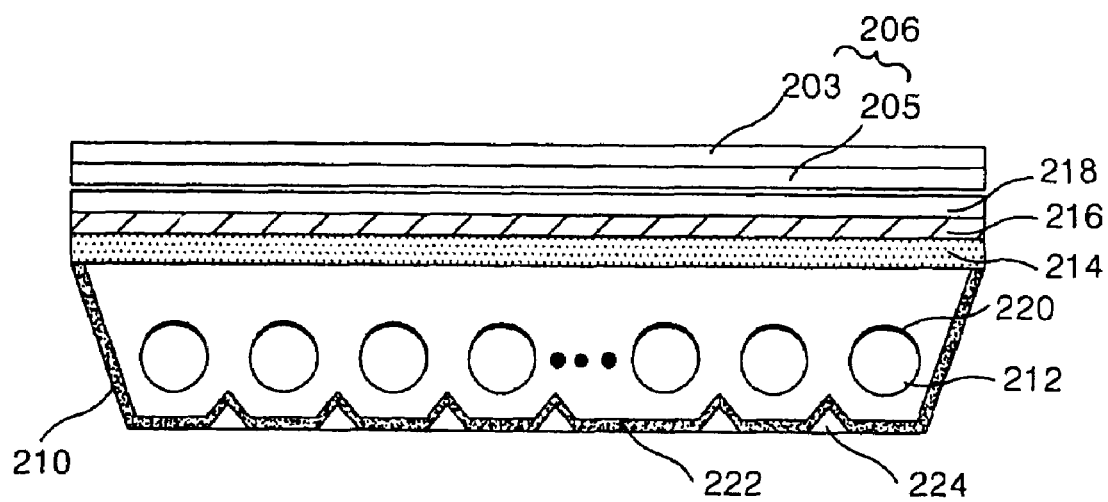
FIG. 9 is a cross sectional view of another exemplary liquid crystal display module according to the present invention.

FIG. 9 is a cross sectional view of another exemplary liquid crystal display module according to the present invention. In FIG. 9, an LCM device may include similar components as those of FIG. 8, and may further include a diffusion plate 214 disposed between the lamp housing 210 and the diffusion film 216. Accordingly, similar explanations provided from the LCM device of FIG. 5 have been omitted for brevity except for the diffusion film 214.

In FIG. 9, the diffusion plate 214 may direct the light radiated from the lamps 212 toward the liquid crystal panel having a wide range of incident angles. The diffusion plate 214 may include a transparent resin film having opposing surfaces coated with light-diffusion material. Accordingly, the diffusion plate 214 may be capable of irradiating more uniform light to the liquid crystal display panel 206.

As detailed above with respect to FIGS. 5-8, by forming a scattering material on surface portions of the lamps, the LCM according to the present invention may be capable of irradiating uniform light toward the liquid crystal display panel, and may reduce a depth (i.e., thickness) of the back light unit. In addition, by forming protrusions projecting from the reflection plate to the lamps, the LCM device may be capable of irradiating more uniform light to the liquid crystal display panel, and may further reduce a depth (i.e., thickness) of the back light unit.

It will be apparent to those skilled in the art that various modifications and variations can be made in the liquid crystal display module of the present invention without departing from the spirit or scope of the invention. Thus, it is intended that the present invention cover the modifications and variations of this invention provided they come within the scope of the appended claims and their equivalents.

What is claimed is:

1. A liquid crystal display module device, comprising:
a lamp housing of a back light unit;
a plurality of lamps in the lamp housing of a back light unit, wherein each of the plurality of lamps includes a tube shape;
a diffusion plate disposed on the lamps, wherein lower and upper surfaces of the diffusion plate have a transparent resin film coated with light-diffusion material to uniformly generate light;
a diffusion film disposed on the diffusion plate to increase an efficiency of the light;
a dual brightness enhancement film disposed on the diffusion film to select one of P-polarized and S-polarized constituents from the light;
a plurality of reflection plates arranged on bottom and side surfaces of the lamp housing and corresponding to each lamp; and
a scattering material made of transparent material and wholly coated only on an upper surface portion of each of the lamps facing toward the diffusion plate to transmit and scatter the light from each of the lamps toward the diffusion plate wherein the upper surface portion is substantially half that of a whole surface of each of the lamps.

2. The device according to claim 1, further comprising:
a liquid crystal display panel disposed on the at least one optical sheet.

3. The device according to claim 1, wherein the scattering material includes at least one of titanium oxide (TiO2) and silicon dioxide (SiO2).

4. The device according to claim 1, wherein each of the plurality of lamps include phosphor material along inner sidewalls of a glass tube.

5. A liquid crystal display module device, comprising:
a lamp housing of a back light unit;
a plurality of lamps in the lamp housing of a back light unit, wherein each of the plurality of lamps includes a tube shape;
a reflection plate disposed on bottom and side surfaces of the lamp housing;
a plurality of protrusions that projects from the bottom surface of the lamp housing having a gap between adjacent lamps;
a diffusion plate disposed on the lamps, wherein lower and upper surfaces of the diffusion plate have a transparent resin film coated with light-diffusion material to uniformly generate light;
a diffusion film on the diffusion plate to increase an efficiency of the light;
a dual brightness enhancement film on the diffusion film to select one of P-polarized and S-polarized constituents from the light;
a liquid crystal display panel disposed on the dual brightness enhancement film; and
a scattering material made of transparent material and wholly coated only on an upper surface portion of each lamp facing toward the diffusion plate to transmit and scatter the light from each of the lamps toward the diffusion plate wherein the upper surface portion is substantially half that of a whole surface of each of the lamps.

6. The device according to claim 5, wherein the protrusions have one of triangular, semicircular, and polygonal shapes.

* * * * *